United States Patent [19]

Konishi et al.

[11] Patent Number: 4,838,563
[45] Date of Patent: Jun. 13, 1989

[54] MOUNTING STRUCTURE FOR VEHICLE HEIGHT SENSOR

[75] Inventors: Junkichi Konishi, Hadano; Kenichi Tsukada, Yokohama; Tomoyoshi Sekiguchi, Atsugi; Masanori Kouda, Segamihara; Minoru Suzuki, Machida, all of Japan

[73] Assignees: Nissan Motor Company, Limited, Yokohama; Atsugi Motor Parts Company, Limited, Atsugi, both of Japan

[21] Appl. No.: 199,340

[22] Filed: May 26, 1988

[30] Foreign Application Priority Data

May 27, 1987 [JP] Japan .............................. 62-80371[U]

[51] Int. Cl.$^4$ ............................................. B60G 17/00
[52] U.S. Cl. ..................................... 280/840; 180/41; 280/DIG. 1
[58] Field of Search .............. 280/6 R, 6 H, 6.1, 6.11, 280/DIG. 1; 180/41

[56] References Cited

U.S. PATENT DOCUMENTS

| | | | |
|---|---|---|---|
| 3,510,143 | 5/1970 | Carpenter | 280/6 R |
| 4,168,840 | 9/1979 | Graham | 280/6 R |
| 4,349,735 | 9/1982 | Maeda | 280/6 R |
| 4,624,477 | 11/1986 | Kumagai et al. | 280/6 R |
| 4,706,988 | 11/1987 | Young | 280/6 R |

*Primary Examiner*—Kenneth R. Rice
*Attorney, Agent, or Firm*—Foley & Lardner, Schwartz, Jeffery, Schwaab, Mack, Blumenthal & Evans

[57] ABSTRACT

A mounting structure of a vehicle height sensor employs a reference height indicative marking put on a sensor body to be rigidly fixed onto a vehicle body, which marking represents a position of a movable sensor component corresponding to a predetermined vehicular height indicative signal level. On the other hand, a target height indicative marking is put on the vehicle body. Alignment of the vehicle height sensor can be adjusted with reference to the reference height indicative marking and the target height indicative marking. Alignment of the vehicle height sensor is achieved by aligning the reference height indicative marking to the target height indicative marking.

14 Claims, 2 Drawing Sheets

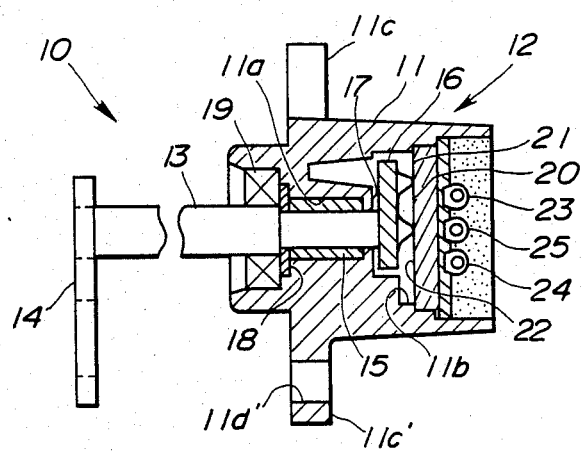
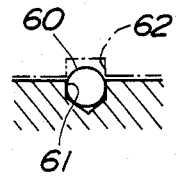
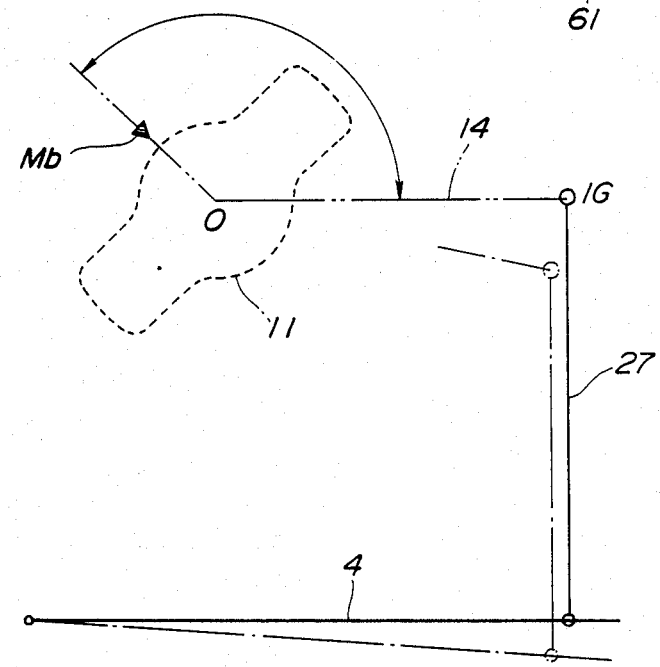

MOUNTING STRUCTURE FOR VEHICLE HEIGHT SENSOR

BACKGROUND OF THE INVENTION

1. Field of the Invention

The present invention relates generally to a mounting structure for a vehicle height sensor which is used for monitoring vehicular height level. More specifically, the invention relates to a mounting structure for a vehicle height sensor for accurately and conveniently mounting the sensor on a vehicle body.

2. Description of the Background Art

In the recent years, various vehicular height regulator systems or vehicular height control systems have been developed for regulating vehicle body attitude. For example, one of the vehicle height control system has been disclosed in the Japanese Utility Model First (unexamined) Publication (Jikkai) No. Showa 55-153212.

For providing accurate vehicular height control, it is essential that a vehicle height indicative signal generated by a vehicle height sensor accurately correspond to the actual height of the vehicular body. In order to make the vehicle height indicative signal value accurately correspond to the actual height, accurate alignment of the vehicle height sensor in mounting the sensor on the vehicle body becomes essential.

In the conventional process to adjust alignment of the vehicle height sensor in mounting the sensor on the vehicle body, a pivotal arm of a vehicle height sensor is fixed at a certain angular position, at which the sensor produces a vehicle height indicative signal indicative of the vehicular height coincident with a preset target vehicle height, by means of a pin. At this condition, the vehicle height sensor is fixed onto the vehicle body. Thereafter, a test load is applied to the vehicle body to adjust the vehicle height so that the height level of a suspension member, such as suspension link or suspension arm, becomes equal to the height level of the arm of the vehicle height sensor. Then, the sensor arm and the suspension member are rigidly connected for cooperation with each other. Thereafter, the shearing load is exerted on the pin to shear the pin to release the sensor arm from restriction. Also, the test load exerted on the vehicle body is released.

Such conventional process is requires additional parts, such as pin for fixing the sensor arm relative to the sensor body, and additional jig for applying the test load. Furthermore, the aforementioned process requires substantial attention to cause lowering of efficiency in adjusting alignment of the vehicle height sensor thus causes rising of the cost.

SUMMARY OF THE INVENTION

Therefore, it is an object of the present invention to provide a mounting structure which makes process in mounting the vehicle height sensor to the vehicle body simplified and less expensive.

Another object of the invention is to provide a vehicle height sensor mounting structure which does not require to adjust the vehicular height level to a target height and thus does not require additional jig for applying test load for adjusting the vehicular height at the target height.

A further object of the invention is to provide a vehicle height sensor mounting structure which is applicable in automated assembling line for automatically mounting the vehicle height sensor on the vehicular body.

In order to accomplish aforementioned and other objects, a mounting structure of a vehicle height sensor, according to the present invention, employs a reference height indicative marking put on a sensor body to be rigidly fixed onto a vehicle body, which marking represents a position of a movable sensor component corresponding to a predetermined vehicular height indicative signal level, On the other hand, a target height indicative marking is put on the vehicle body. Alignment of the vehicle height sensor can be adjusted with reference to the reference height indicative marking and the target height indicative marking.

In the practical mounting operation, alignment of the vehicle height sensor is achieved by aligning the reference height indicative marking to the target height indicative marking.

According to one aspect of the invention, a mounting structure for a vehicle height sensor for monitoring relative distance between a vehicular body and a suspension member rotatably supporting a vehicular wheel, comprises a sensor body housing therein a vehicular height sensor mechanism therewithin, the sensor body being mounted on the vehicular body, the vehicular height sensor mechanism including a movable member extending from the sensor body and to be associated with the suspension member for movement according to vertical displacement between the vehicular body and the suspension member, a first means, associated with the vehicular body, for indicating a first reference point on the vehicular body, which first reference point is determined relative to a height position of the suspension member when the relative distance between the vehicular body and the suspension member is held at a predetermined first reference value, and a second means, associated with the sensor body, for indicating a second reference point and to be aligned with the first reference point in mounting the sensor body onto the vehicular body, the second means deriving the first point based on a reference position of the movable member, at which a value of a vehicular height indicative sensor signal generated by the vehicle height sensor is held at a predetermined second reference value representative of the relative distance held at the first reference value.

In the preferred construction, the movable member includes means for converting a magnitude of a vertical stroke of the suspension member relative to the vehicular body into a rotational magnitude and the second means derives the second reference point on the basis of rotational magnitude of the movable member to reach the position where the vehicular height indicative signal value coincident with the first reference value. The first means is oriented on the sensor body at a position shifted from the movable member position where the vehicular height indicative signal value coincident with the first reference value, by a given first angle. The second means is oriented on the vehicular body at a position shifted from the suspension member height position when the relative distance between the vehicular body and the suspension member is held at a predetermined first reference value, by a given second angle. The first and second angles correspond to each other.

The first and second means are markings put on the sensor body and the vehicular body respectively. One of the first and second means comprises a projecting marking and the other comprises a recessed marking which receives the projecting marking for alignment of the vehicle height sensor.

According to another aspect of the invention, a method for mounting a vehicle height sensor on a vehicular body for monitoring relative distance between the vehicular body and a suspension member rotatably supporting a vehicular wheel, which vehicle height sensor comprising a sensor body housing therein a vehicular height sensor mechanism therewithin, the sensor body being mounted on the vehicular body, the vehicular height sensor mechanism including a movable member extending from the sensor body and to be associated with the suspension member for movement according to vertical displacement between the vehicular body and the suspension member, the method comprising the steps of:

indicating a first reference point by means of a first mark on the vehicular body, which first reference point is determined relative to a height position of the suspension member when the relative distance between the vehicular body and the suspension member is held at a predetermined first reference value; and indicating a second reference point by means of a second mark which is to be aligned with the first mark in mounting the sensor body onto the vehicular body, the second reference point being derived on the basis of a reference position of the movable member, at which a value of a vehicular height indicative sensor signal generated by the vehicle height sensor is held at a predetermined second reference value representative of the relative distance held at the first reference value.

BRIEF DESCRIPTION OF THE DRAWINGS

In the drawings:

FIG. 3 is a section taken along line III—III of FIG. 2;

FIG. 4 is an illustration showing a target height indicative marking put on a vehicular body; and FIG. 5 is an illustration of modification of the markings employed in the preferred embodiment of the mounting structure of the vehicle height sensor which can be employed in the vehicle height control system of FIG. 1.

DESCRIPTION OF THE PREFERRED EMBODIMENT

Figure 1:
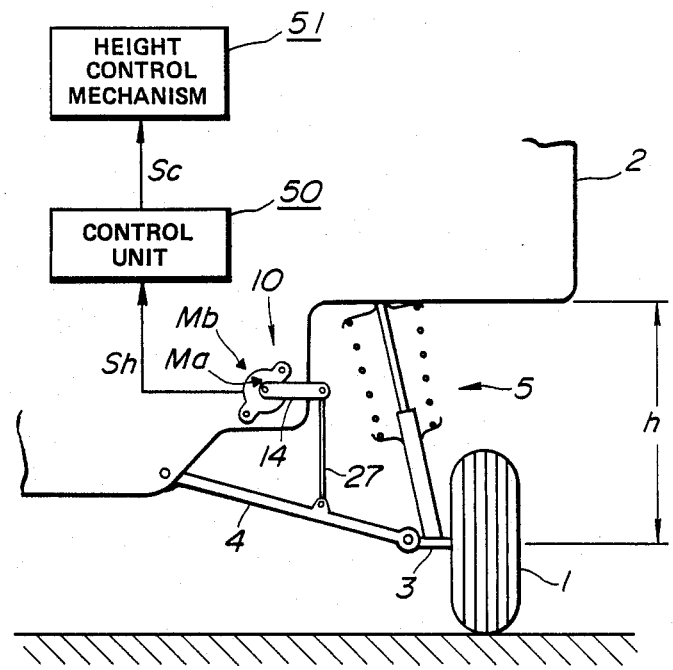
FIG. 1 is a fragmentary illustration of a vehicular suspension system which can be associated with a vehicle height control system with a vehicular height suspension mounted on a vehicular body by the preferred embodiment of mounting structure thereof.

Referring now to the drawings, particularly to FIG. 1, there is illustrated a strut type automotive suspension system having a suspension strut assembly 5 interposed between a knucle 3 rotatably supporting a vehicular wheel 1, and a vehicular body 2. A transverse link 4 is connected to the knucle 3 at the outer end and extends transversely to the longitudinal axis of the vehicle body.

As is well known, the suspension strut assembly 5 includes shock absorber or damper, and a suspension coil spring 6. The suspension strut assembly 5 may be provided a feature of vehicular height control, suspension characteristics control and so forth. Vehicular height control can be performed by various ways. For example, the damper can be connected to a working fluid pressure source via a pressure control valve for adjusting working fluid pressure in the damper for adjusting the vehicular height. On the other hand, vehicular height adjustment can be performed by providing pneumatic chamber above the damper and connecting the pneumatic chamber to a pneumatic pressure source via a pressure controllable circuit. In this case, pneumatic pressure in the pneumatic pressure chamber is adjusted for adjusting the vehicular height.

In either case, vehicular height control is performed on the basis of a vehicular height indicative data. In order to obtain the vehicular height indicative data, a vehicle height sensor 10 is provided in the suspension system of FIG. 1. In the construction shown in FIG. 1, the vehicular height sensor 10 generally comprises a sensor housing 11 to be rigidly fixed onto the vehicle body 2, and a sensor arm 14 connected to the transverse link 4 via a connecting link 27. The suspension arm 14 is pivotable in a magnitude corresponding to the vertical displacement magnitude of the transverse link 4. A sensor housed in the sensor housing 11 monitors angular displacement from a predetermined neutral position for generating a vehicular height indicative sensor signal as the vehicular height indicative data.

In the practical vehicular height control, the vehicular height indicative data is compared with a reference values representative of upper and lower vehicular height criteria which is determined relative to a predetermined target height and define normal vehicular height range. When the vehicular height out of the normal vehicular height range is detected, height adjustment is performed by adjusting fluid pressure in the damper in former case and by adjusting the pneumatic pressure in the pneumatic chamber in the latter case.

Figure 2:
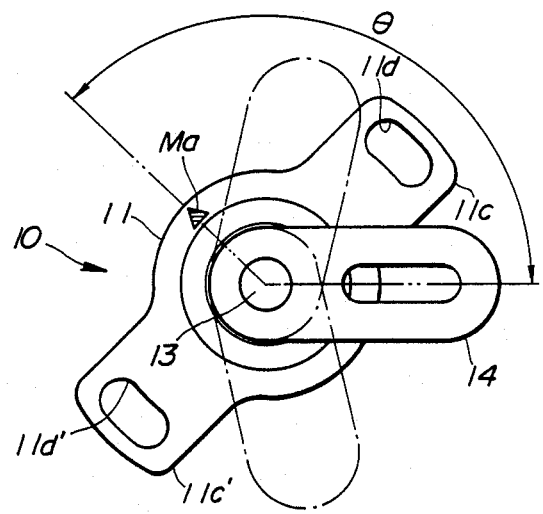
FIG. 2 is an enlarged front elevation of a vehicle height sensor employed in the preferred embodiment of the vehicle height control system.

FIGS. 2 and 3 show the preferred construction of the vehicular height sensor 10 to be employed in the vehicular height control system. The sensor body 11 has a generally cylindrical body with a pair of radially symmetrically extending flanges 11c. The sensor body 11 has an axially extending center hole 11a to receive therethrough a rotary shaft 13 having a free end extending outside of the sensor body and rigidly connected to the sensor arm 14. A sleeve bearing 15 is fitted on the inner periphery of the hole 11a and thus rotatably supports the rotary shaft 13. The inner end of the rotary shaft 13 is rigidly connected to a rotary disc 16 which carries a pair of movable contacts 20 and 21. As will be seen from FIG. 3, the movable contact 20 is arranged at an orientation in alignment with the axis of the rotary shaft 13. On the other hand, the movable contact 21 is arranged at an orientation offsetting from the axis of the rotary shaft 13. The rotary disc 16 has a surface remote from the movable contacts 20 and 21, which surface mates with a planer surface of inboard extension of the sensor body 10. A thrust bearing 17 is interposed between the mating surfaces.

A thrust bearing 18 and a sealing ring 19 are provided in the vicinity of the outer end of the hole 11a.

Opposing to the rotary disc 16, a resistance plate 22 is provided. The resistance plate 22 is held in contact with the movable contacts 20 and 21 for establishing electrical communication therewith. In order to establish electrical communication, a terminal is printed on the resistance plate 22 at an orientation mating with the movable contact 20. Also, an arc-shaped terminal is printed on the resistance plate 22 at an orientation corresponding to the radial position of the movable contact 21 relative to the axis of the rotary shaft 13. The arc-shaped terminal extends along the circumferential edge of the resistance plate and along the trace of the movable contact 21. Both ends of the arc-shaped terminal are connected to connecting terminals 23 and 24. On the other hand, the center terminal contacting with the movable contact 20 in connected to a connecting terminal 25. The terminals 23 and 24 are connected to direct current source. When a given voltage Ea is applied between the terminals 23 and 24. Output of a voltage Eb is obtained at the terminal 25. The output voltage Eb at the terminal 25 is variable depending upon the position of the movable contact 21 relative to the arc-shaped terminal, which position of the movable contact 21 represents angular position of the sensor arm. Therefore, the output at the terminal 25 is variable depending upon the angular position of the sensor arm 14. Since the sensor arm 14 is connected to the transverse link 4 which pivotally displaced according to relative vertical displacement between the vehicular body 2 and the vehicular wheel 1 rotatably supported by the knuckle 3, the pivoting magnitude of the sensor arm 14 represents magnitude of the relative vertical displacement between the vehicular body 2 and the vehicular wheel 1. Therefore, the output at the terminal 25 represents the relative distance between the the vehicular body 2 and the vehicular wheel 1.

The terminal 25 is connected to a control unit 50 which may comprise a microprocessor. Based on the vehicular height indicative data Sh represented by the output at the terminal 25, the control unit 50 performs vehicular height control program to derive a height control signal Sc. The height control signal Sc is fed to a height control mechanism 51 which is associated with the suspension strut 5 to control vehicular body height position relative to the vehicular wheel 1.

In practical operation, the control unit 50 is preset a target height and a normal height range defined relative to the target height and by upper and lower height criteria. The control unit compares the vehicle height indicative data Sh obtained from the output at the terminal 25 of the vehicle height sensor 10. When the vehicular height indicative data Sh indicates the vehicular height lower than the lower height criterion, the control unit 50 output the height control signal Sc ordering operation of the height control mechanism 51 for increasing the vehicular height. On the other hand, when the vehicular height indicative data Sh indicates the vehicular height higher than the upper height criterion, the control unit 50 outputs the height control signal Sc ordering operation of the height control mechanism 51 to lower the vehicular height.

As set forth above, in order to accurately control the vehicular height, it is essential to have the vehicle height sensor 10 to produce the vehicular height indicative data Sc having a predetermined value corresponding to the target vehicular height while the vehicle height is held at the target height. For obtaining the accurate vehicular height indicative data, accurate or precise alignment of the vehicular height sensor 10 is essential. For allowing fine adjustment of alignment of the vehicle height sensor 10, elongated openings 11d are formed through the flanges 11c of the sensor body. In addition, a reference point marking Ma is put on the sensor body 11 which represents mounting position of the sensor body for obtaining the target height indicative output at the terminal 25.

In order to determine position of the reference point marking Ma, a test voltage corresponding to the constant voltage Ea is applied between the terminals 23 and 24 of the vehicle height sensor 10. At this condition, the sensor arm 14 is pivotally moved with monitoring output voltage Eb at the terminal 25. When the output voltage Eb becomes coincident with a preset value which corresponds to the predetermined vehicular height indicative data indicative of the target height. The angular position of the sensor arm 14 is set as sensor arm reference angle position. The reference point marking position Ma is shifted from this sensor arm reference angle position in a predetermined angle $\theta$. Therefore, the reference point marking Ma is put at the position of the sensor body circumferentially shifted from the sensor arm reference angle position by the predetermined angle $\theta$, as shown in FIG. 2.

On the other hand, a target height indicative marking Mb is put on the vehicle body 2 at an orientation where the sensor body 11 is to be mounted. In the practical sensor mounting process, the reference point marking Ma on the sensor body 11 is placed in alignment with the target height indicative marking Mb of the vehicular body 2 for obtaining satisfactorily height precision in alignment of the vehicle height sensor 10.

Process of setting the angular position of the target height indicative marking Mb will be discussed herebelow with reference to FIG. 4. As seen from FIG. 4, position IG of the upper end of the connecting link 27 when the vehicular height level is precisely at the target height, is imaginarily determined. This position IG corresponds the position of the adjoining end of the sensor arm 14. The position of the target height indicative marking Mb is set at a position angularly shifted from this IG position in the predetermined angle $\theta$.

In the vehicle height sensor mounting process, what is only required is to place the reference point marking Ma on the sensor body 11 in alignment with the target height indicative marking Mb on the vehicle body. This clearly simplifies required operation for mounting the vehicle height sensor onto the vehicular body. Furthermore, since no additional member, such as pin for fixing the position of the sensor arm at the angular position corresponding to the target height, which was required in the prior art, and additional jig, such as the jig for applying test load on the vehicle body, becomes unnecessary.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment employs the painted or punched markings put on the sensor body and the vehicle body, it can be placed with projection and projection receptacle recess as shown in FIG. 5. In the shown example in FIG. 5, a ball shaped member 60 is rigidly secured within a V-shaped recess 61 formed on one of the sensor body and the vehicular body and a ball receptacle recess 62 is formed on the other of the sensor body and the vehicular body.

Furthermore, though the foregoing discussion is given in concentration to the vehicular height control based on the vehicular height indicative data, the vehicular height indicative signal generated by the vehicle height sensor thus mounted on the vehicle body in accurate manner, is useful in various vehicular control. For example, such vehicular height sensor may be applicable for suspension characteristics control for adjusting stiffness of the suspension. In addition, such vehicular height indicative data may be useful in controlling variable position air spoiler arrangement for controlling spoiler position between the active position and inactive position depending upon the road roughness condition. Furthermore, such vehicular height indicative data may be useful in vehicular brake control system, such as an anti-skid or anti-lock brake control system as vehicular attitude indicative data. Anti-skid brake control systems employing the vehicular height indicative data as one of brake control parameters as vehicular attitude indicative data for detecting vehicular rolling and/or pitching.

What is claimed is:

1. A mounting structure for a vehicle height sensor for monitoring relative distance between a vehicular body and a suspension member rotatably supporting a vehicular wheel, comprising:
    a sensor body housing therein a vehicular height sensor mechanism therewithin, said sensor body being mounted on said vehicular body, said vehicular height sensor mechanism including a movable member extending from said sensor body and to be associated with said suspension member for movement according to vertical displacement between said vehicular body and said suspension member;
    a first means, associated with said vehicular body, for indicating a first reference point on said vehicular body, which first reference point is determined relative to a height position of said suspension member when the relative distance between said vehicular body and said suspension member is held at a predetermined first reference value; and
    a second means, associated with said sensor body, for indicating a second reference point and to be aligned with said first reference point in mounting said sensor body onto said vehicular body, said second means deriving said first point based on a reference position of said movable member, at which a value of a vehicular height indicative sensor signal generated by said vehicle height sensor is held at a predetermined second reference value representative of said relative distance held at said first reference value.

2. A mounting structure as set forth in claim 1, wherein said movable member includes means for converting a magnitude of a vertical stroke of said suspension member relative to said vehicular body into a rotational magnitude and said second means derives said second reference point on the basis of rotational magnitude of said movable member to reach said position where sad vehicular height indicative signal value coincident with said first reference value.

3. A mounting structure as set forth in claim 2, wherein said first means is oriented on said sensor body at a position shifted from said movable member position where said vehicular height indicative signal value coincident with said first reference value, by a given first angle.

4. A mounting structure as set forth in claim 3, wherein said second means is oriented on said vehicular body at a position shifted from said suspension member height position when the relative distance between said vehicular body and said suspension member is held at a predetermined first reference value, by a given second angle.

5. A mounting structure as set forth in claim 4, wherein said first and second angles correspond to each other.

6. A mounting structure as set forth in claim 1, wherein said first and second means are markings put on said sensor body and said vehicular body respectively.

7. A mounting structure as set forth in claim 6, wherein one of said first and second means comprises a projecting marking and the other comprises a recessed marking which receives said projecting marking for alignment of said vehicle height sensor.

8. A method for mounting a vehicle height sensor on a vehicular body for monitoring relative distance between said vehicular body and a suspension member rotatably supporting a vehicular wheel, which vehicle height sensor comprising a sensor body housing therein a vehicular height sensor mechanism therewithin, said sensor body being mounted on said vehicular body, said vehicular height sensor mechanism including a movable member extending from said sensor body and to be associated with said suspension member for movement according to vertical displacement between said vehicular body and said suspension member, said method comprising the steps of:
    indicating a first reference point by means of a first mark on said vehicular body, which first reference point is determined relative to a height position of said suspension member when the relative distance between said vehicular body and said suspension member is held at a predetermined first reference value; and
    indicating a second reference point by means of a second mark which is to be aligned with said first mark in mounting said sensor body onto said vehicular body, said second reference point being derived on the basis of a reference position of said movable member, at which a value of a vehicular height indicative sensor signal generated by said vehicle height sensor is held at a predetermined second reference value representative of said relative distance held at said first reference value.

9. A method as set forth in claim 8, wherein further comprises step of converting a magnitude of a vertical stroke of said suspension member relative to said vehicular body into a rotational magnitude and said second reference point reference point is derived on the basis of rotational magnitude of said movable member to reach said position where said vehicular height indicative signal value coincident with said first reference value.

10. A method as set forth in claim 9, wherein said first reference point is oriented on said sensor body at a position shifted from said movable member position where said vehicular height indicative signal value coincident with said first reference value, by a given first angle.

11. A method as set forth in claim 10, wherein said second reference point is oriented on said vehicular body at a position shifted from said suspension member height position when the relative distance between said vehicular body and said suspension member is held at a predetermined first reference value, by a given second angle.

12. A method as set forth in claim 11, wherein said first and second angles correspond to each other.

13. A method as set forth in claim 8, wherein said first and second reference points are indicated by means of markings put on said sensor body and said vehicular body respectively.

14. A method as set forth in claim 13, wherein one of markings comprises a projecting marking and the other comprises a recessed marking which receives said projecting marking for alignment of said vehicle height sensor.

* * * * *